(12) United States Patent
Seligmann et al.

(10) Patent No.: US 10,237,082 B2
(45) Date of Patent: Mar. 19, 2019

(54) SYSTEM AND METHOD FOR MULTIMODAL INTERACTION AIDS

(75) Inventors: Doree Duncan Seligmann, New York, NY (US); Reinhard Klemm, Basking Ridge, NJ (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 607 days.

(21) Appl. No.: 13/600,817

(22) Filed: Aug. 31, 2012

(65) Prior Publication Data

US 2014/0067936 A1 Mar. 6, 2014

(51) Int. Cl.
H04L 12/18 (2006.01)

(52) U.S. Cl.
CPC ...... *H04L 12/1827* (2013.01); *H04L 12/1818* (2013.01); *H04L 12/1822* (2013.01)

(58) Field of Classification Search
CPC .......................... H04L 12/1822; H04L 65/403; H04L 12/1827
See application file for complete search history.

(56) References Cited

U.S. PATENT DOCUMENTS

| | | | |
|---|---|---|---|
| 5,710,591 A * | 1/1998 | Bruno | H04M 3/42221 348/14.06 |
| 6,687,338 B2 | 2/2004 | Seligmann | |
| 7,046,784 B2 | 5/2006 | Seligmann | |
| 7,593,686 B1 * | 9/2009 | Knoop | H04N 7/17318 455/3.01 |
| 8,107,401 B2 | 1/2012 | John et al. | |
| 8,405,702 B1 * | 3/2013 | Gottlieb | H04N 7/15 348/14.08 |
| 2002/0034720 A1 * | 3/2002 | McManus et al. | 434/350 |
| 2004/0042615 A1 * | 3/2004 | Scholte | H04M 1/6033 379/387.01 |
| 2007/0260687 A1 * | 11/2007 | Rao | H04L 12/1827 709/204 |
| 2009/0013045 A1 * | 1/2009 | Maes et al. | 709/205 |
| 2009/0112589 A1 * | 4/2009 | Hiselius | H04M 1/576 704/246 |
| 2009/0282103 A1 * | 11/2009 | Thakkar et al. | 709/204 |
| 2010/0241512 A1 * | 9/2010 | Tirpak | G06Q 30/0251 705/14.49 |
| 2011/0179180 A1 * | 7/2011 | Schleifer | H04L 12/1818 709/227 |
| 2014/0176665 A1 * | 6/2014 | Gottlieb | H04N 7/15 348/14.08 |
| 2014/0344360 A1 * | 11/2014 | Bank et al. | 709/204 |

* cited by examiner

*Primary Examiner* — Joe Chacko
(74) *Attorney, Agent, or Firm* — Sheridan Ross P.C.

(57) ABSTRACT

Disclosed herein are systems, methods, and non-transitory computer-readable storage media for providing multimodal interaction aids in multimedia events. The system presents a multimedia event to a participant which has limited access to the multimedia event, wherein the limited access prevents the participant from experiencing every mode of the multimedia event. The system also generates a cue associated with the multimedia event, wherein the cue is structured according to the limited access of the participant. The system then transmits the cue to a device associated with the participant.

17 Claims, 5 Drawing Sheets

SYSTEM AND METHOD FOR MULTIMODAL INTERACTION AIDS

BACKGROUND

1. Technical Field

The present disclosure relates to multimedia events and more specifically to providing multimodal interaction aids in multimedia events.

2. Introduction

Multimedia conferences are widely used by users in business and private settings to hold meetings, lectures, presentations, and training events. By implementing different types of media, such as video and audio, multimedia conferences greatly enhance the user experience. For example, a presenter in a web conference can provide verbal comments throughout a presentation shared with a group. The group can follow the presentation through a shared display while listening as the presenter explains the material. Both the verbal and visual components of the presentation can be extremely valuable to the group, and the combination can enrich the group's overall experience.

Often, however, there are a number of participants that have limited access to various events and media in the multimedia conference. For example, a participant may be connected to the multimedia conference through an audio bridge that limits the participant's media access to audio. Here, the participant is only able to receive the audio portion of the multimedia conference. Thus, if the multimedia conference includes a slide presentation, for example, the participant must follow the slide presentation using a local copy. However, when using a local copy, the participant is unable to see the presenter's interactions with the slide presentation. The participant may not know which slide is currently being presented or which portion is being edited. Moreover, the presentation would be disrupted if the presenter is required to announce when he or she opens or closes a slide. Consequently, the participant may have difficulty staying with the flow of the slide presentation and obtaining a full user experience, without disrupting the flow of the presentation.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can intelligently provide multimedia cues to participants with limited access to events and media in a multimedia event. The multimedia cues can greatly enhance the participant's user experience in the multimedia event without disrupting the flow of the overall multimedia event. The multimedia cues can vary according to a participant's needs and media access capabilities. Moreover, the multimedia cues can be generated using information about the events, interactions, and user's communication context to provide a granular and robust solution to the varied media access limitations of participants in a multimedia event.

Disclosed are systems, methods, and non-transitory computer-readable storage media for providing multimodal interaction aids in multimedia events. The system presents a multimedia event to a participant which has limited access to the multimedia event, wherein the limited access prevents the participant from experiencing every mode of the multimedia event. The system also generates a cue associated with the multimedia event, wherein the cue is structured according to the limited access of the participant. The system then transmits the cue to a device associated with the participant. The system can deliver the cue to the device associated with the participant using, for example, an image, a video, text and/or audio.

The cue can be structured according to, as non-limiting examples, an event, an interaction, an access mode, a parameter, a profile, a tag, an input, a parameter, a schedule, a user, a group, a location, a language, a preference, a definition, a rule, a style, a design, a template, a request, a restriction, a disability, an intent, an application, a delivery method, an environment, an audience, a communication context, a presentation, a schema, a media type, a topic, a subject, a file, a message, domain information, device capabilities, and any combination thereof. The cue can be a signal, a prompt, a sound effect, a visual effect, a graphic enhancement, an indication, a suggestion, and/or information associated with the multimedia event and/or media in the multimedia event. Moreover, the cue can provide a description, comment, representation, illustration, identification, communication, summary, definition, interpretation, and/or explanation of an interaction in the multimedia event. For example, a cue can be a signal that an interaction has taken place, such as an audio announcement of a slide transition. The cue can include, as non-limiting examples, an audio cue, a video cue, a caption, a pop-up, an image, an animation, an alert, a message, a number, a symbol, an announcement, a character, and so forth. In one aspect, the cue is a verbal slide transition announcement in a slide presentation. Moreover, the cue can be embedded in the multimedia event or separate from the multimedia event.

The multimedia event can include, for example, a slide presentation, a conference call, a web conference, a video conference, a webcast, an online collaboration, a chat, a blog, a wiki, a web page, an online game, an online activity, and so forth. The generation and/or transmission of the cue can be triggered by, as non-limiting examples, a visual event, an audio event, an external event, an input, an interaction, a tag, a profile, a message, a schedule, a transition, a parameter, a request, a rule, etc.

Further, the system can query the device associated with the participant to determine the media access capabilities of the participant. In one embodiment, the system presents the multimedia event to a plurality of participants, queries a respective device associated with each of the plurality of participants to determine respective media access capabilities associated with each of the plurality of participants, and generates a set of cues associated with the multimedia event, wherein the set of cues is structured according to the respective media access capabilities. In another embodiment, the multimedia event includes a slide presentation and the cue is a slide number that is converted to speech from text and presented as audio when a respective slide is opened.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for multimodal interaction aids in multimedia events. A system, method and non-transitory computer-readable media are disclosed which provide multimodal interaction aids in multimedia events. A brief introductory description of a basic general purpose system or computing device in FIG. 1, which can be employed to practice the concepts, is disclosed herein. A more detailed description of an architecture of a multimedia event in FIG. 2, and cues in a multimedia event in FIG. 3, will then follow. The disclosure next turns to the exemplary system for generating multimodal interaction aids for presentations in FIG. 4. Finally, the disclosure turns to the exemplary method embodiment in FIG. 5. These variations shall be discussed herein as the various embodiments are set forth. The disclosure now turns to FIG. 1.

Figure 1:
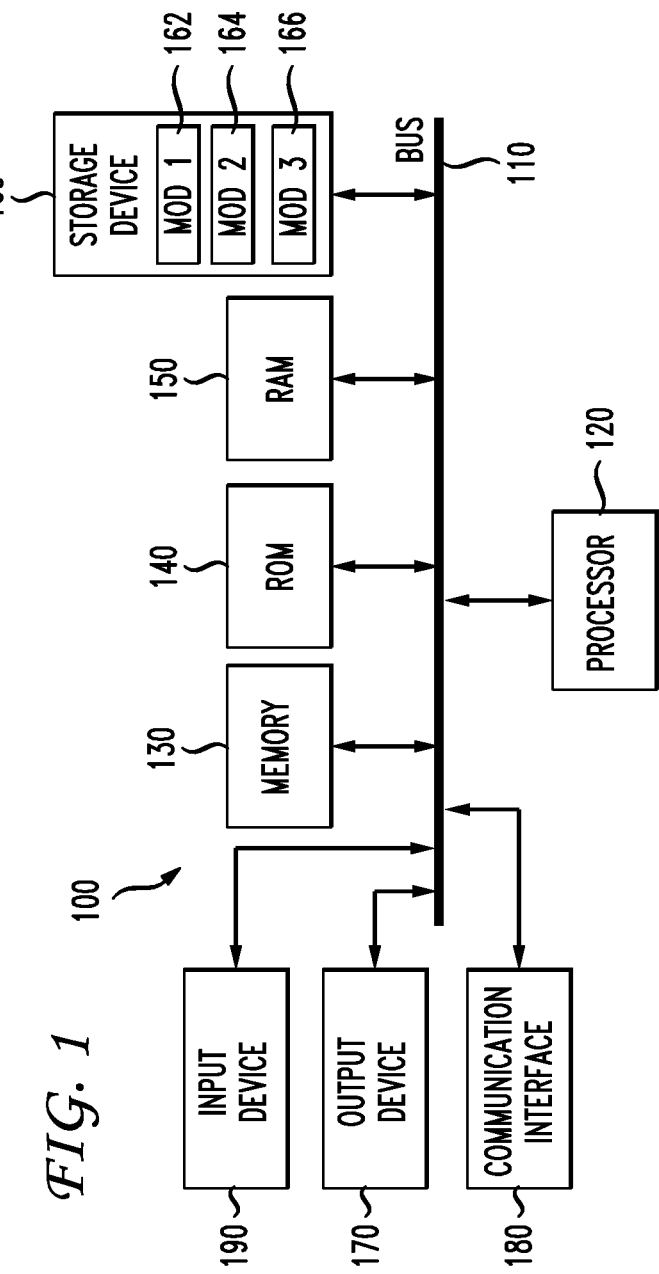
FIG. 1 illustrates an example system embodiment.

With reference to FIG. 1, an exemplary system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the computing device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, and the like, may also be used in the exemplary operating environment. Computer-readable storage media and devices expressly exclude transitory media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
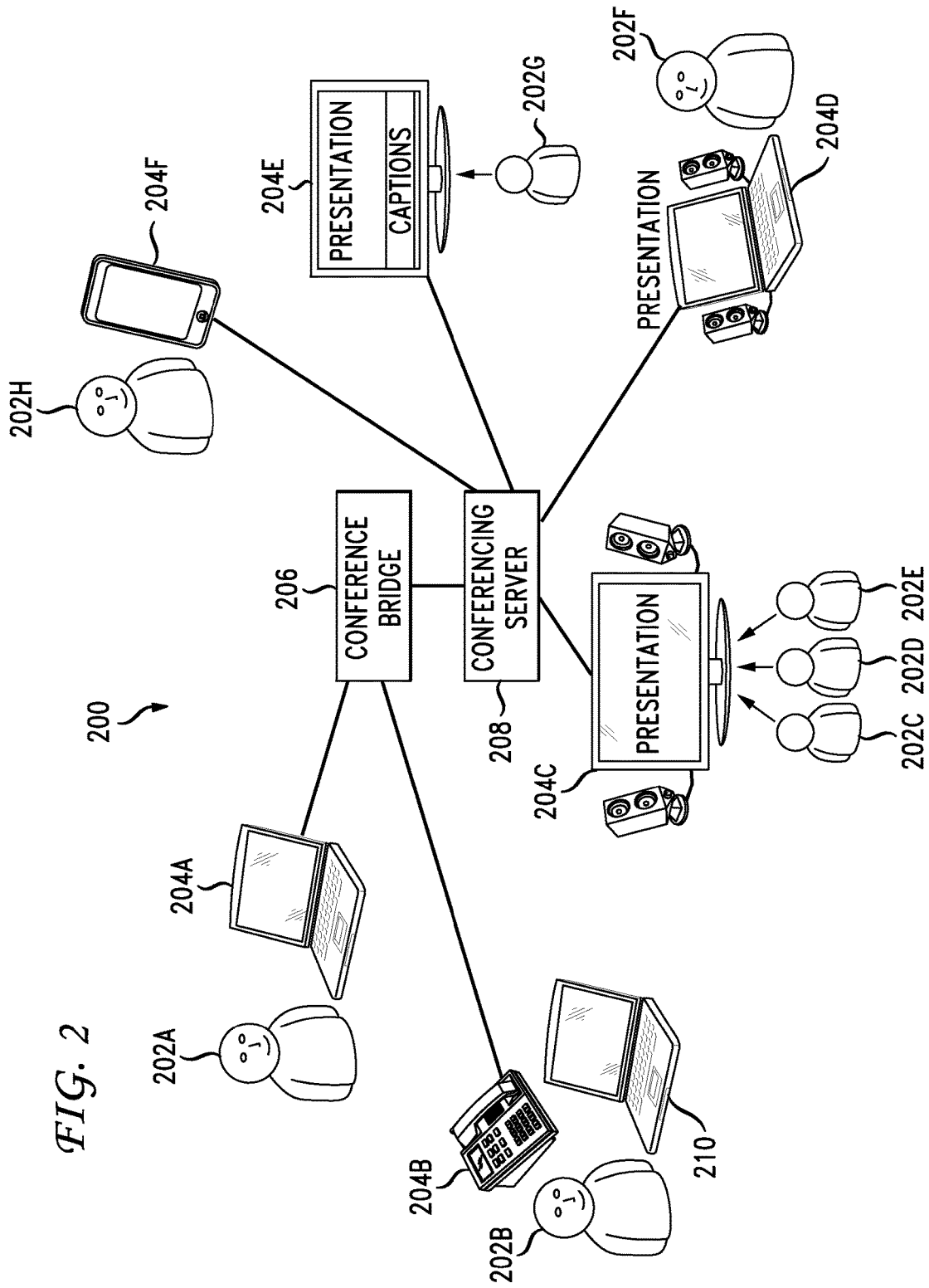
FIG. 2 illustrates an exemplary architecture of a multimedia event.

Having disclosed some components of a computing system, the disclosure now turns to FIG. 2, which illustrates an exemplary architecture 200 of a multimedia event. The participants 202A-H use the media devices 204A-F to participate in the multimedia event. The media devices 204C-F can include virtually any media devices, such as mobile phones, conferencing systems, laptops, media players, online gaming systems, IP phones, and so forth. In FIG. 2, media devices 204A and 204D are laptop computers, media device 204B is an IP phone, media devices 204C and 204E are IP televisions, and media device 204F is a mobile phone. Other exemplary media devices can include, as non-limiting examples, tablet computers, hand held music or audio players having networking capabilities, and vehicles equipped with mobile network access. Each of the media devices is capable of rendering media communications, whether those media communications be audio, video, text, or some other communication format.

The media devices 204C-F connect via the conferencing server 208 to receive various types of media, such as audio and video, from the multimedia event. The participants 202C-H can then access the multimedia from the multimedia event using the devices 204C-F. If any of the devices 204C-F is unable to render a type of media from the multimedia event, the conferencing server 208 can transmit cues to the specific device to deliver information associated with the media the device is unable to render. In FIG. 2, the conferencing server 208 transmits captions to the device 204E, which is unable to render audio.

The media devices 204A-B connect to the conferencing server 208 via a conference bridge 206. Through the conference bridge 206, the media devices 204A-B can receive audio from the multimedia event. The participants 202A-B can then follow the audio in the multimedia conference from the media devices 204A-B. The participants 202A-B can also access local versions of some other types of media in the multimedia conference in order to follow the multimedia conference. For example, participant 202A can access a local copy of a presentation from the media device 204A to follow the presentation in the multimedia event. Participant 202A can similarly access a local copy of the presentation from the media device 210 to follow the presentation in the multimedia event. Further, the conferencing server 208 can transmit audio cues to the media devices 204A-B. The cues can be based on events, interactions, and media that the media devices 204A-B are unable to access. For example, the cues can be an audio announcement indicating that a specific slide is being presented in the multimedia event.

Figure 3:
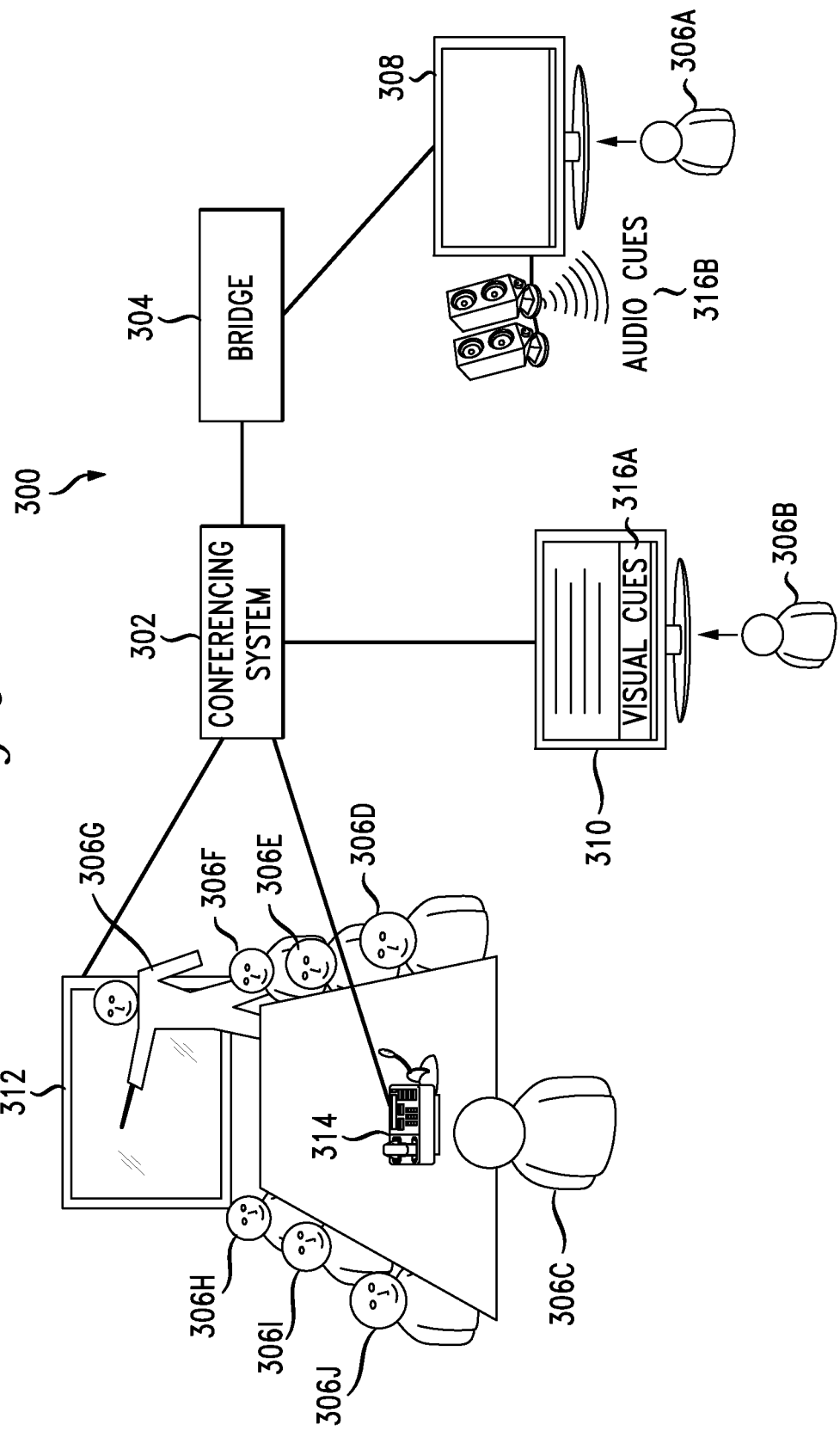
FIG. 3 illustrates example cues in an exemplary multimedia event.

FIG. 3 illustrates example cues in an exemplary multimedia event 300. Here, the multimedia event includes a slide presentation and audio comments from the participants 306A-J. The conferencing system 302 transmits the slide presentation to the media devices 310 and 312. The conferencing system 302 also transmits audio from the participants 306A-J to the media devices 308, 310, and 314. The media device 308 connects to the conferencing system 302 via the bridge 304.

The slide presentation is displayed on the media device 312. The participants 306C-J can follow the slide presentation on the media device 312 and make any comments, which can be transmitted to the media devices 308 and 310 via the media device 314. The participants 306C-J can also receive audio comments from participants 306A-B via the media device 314. The participant 306B can follow the slide presentation on the media device 310. In this example, the media device 310 does not have audio playback capabilities. Accordingly, the conferencing system 302 can transmit visual cues 316A to the media device 310. For example, the conferencing system 302 can transmit annotations, enhancements, and/or captions to the media device 310. As another example, the conferencing system 302 can transmit pop-ups to the media device 310. The visual cues 316A can include text, video, images, icons, symbols, characters, numbers, links, etc. The visual cues 316A can be triggered by an interaction, an event, a tag, a schedule, a profile, a subscription, and so forth. For example, the visual cues 316A can be triggered when a participant begins talking. The visual cues 316A can be structured based on the participant's communication context and/or device capabilities. The visual cues 316A can also be structured based on an event, an interaction, a media, a topic, a parameter, a style, a schema, a template, a profile, an environment, a disability, a group, and so forth.

The participant 306A receives the audio associated with the conferencing event on the media device 308 via the bridge 304. The bridge 304 does not transmit the slide presentation to the media device 308. Accordingly, the participant 306A can follow the slide presentation from a local copy on the media device 308. The media device 308 receives audio cues 316B from the conferencing system 302. For example, the media device 308 can receive an audio cue announcing the current slide number. In one embodiment, the conferencing system 302 transmits verbal slide transitions to the media device 308. The verbal slide transitions can include speech converted from text. The participant 306A can use the audio cues 316B, for example, to know when to transition to a new slide on the local copy of the slide presentation. Moreover, the conferencing system 302 can generate slide transition announcements based on tracking slide transitions and generating appropriate verbal slide transition cues by recognizing that the presentation has moved to another slide, sensing from the presentation the slide number or keeping track of how many slides have been presented. Other versions of slide transition cues such as the verbal announcement of 'net slide' are also possible.

The audio cues 316B can be triggered by, as non-limiting examples, an interaction, an event, a tag, a schedule, a profile, a message, a subscription, and so forth. For example, the audio cues 316B can be triggered when the slide presentation is paused. The audio cues 316B can be generated using various audio mixing and coloration technologies, or other technologies such as 3D spatial audio to make the audio cues 316B distinguishable from the presenter's verbal delivery to the listeners. Moreover, the audio cues 316B can be structured based on the participant's communication context and/or device capabilities. The audio cues 316B can also be structured based on an event, an interaction, a media, a topic, a parameter, a style, a schema, a template, a profile, an environment, a disability, a group, and so forth.

The cues 316A-B can be turned on or off programmatically and/or manually. Similarly, the cues 316A-B can be selected manually or automatically. The cues 316A-B can be selected automatically based on, as non-limiting examples, an interaction, an event, a parameter, a profile, a tag, a style, a preference, a message, a communication context, an access mode, a schedule, a schema, a template, a group, a topic, an application, device capabilities, media, and so forth. The cues 316A-B can be edited, muted, paused, selected, replaced, replayed, deleted, etc. Events and interactions used to trigger the cues 316A-B can be turned on or off prior to presentation or during presentation. The conferencing system 302 can make a decision not to transmit a cue for an event based on a context. For example, the conferencing system 302 can sense out-of-order slide transitions and mute the audio cues 316B.

Figure 4:
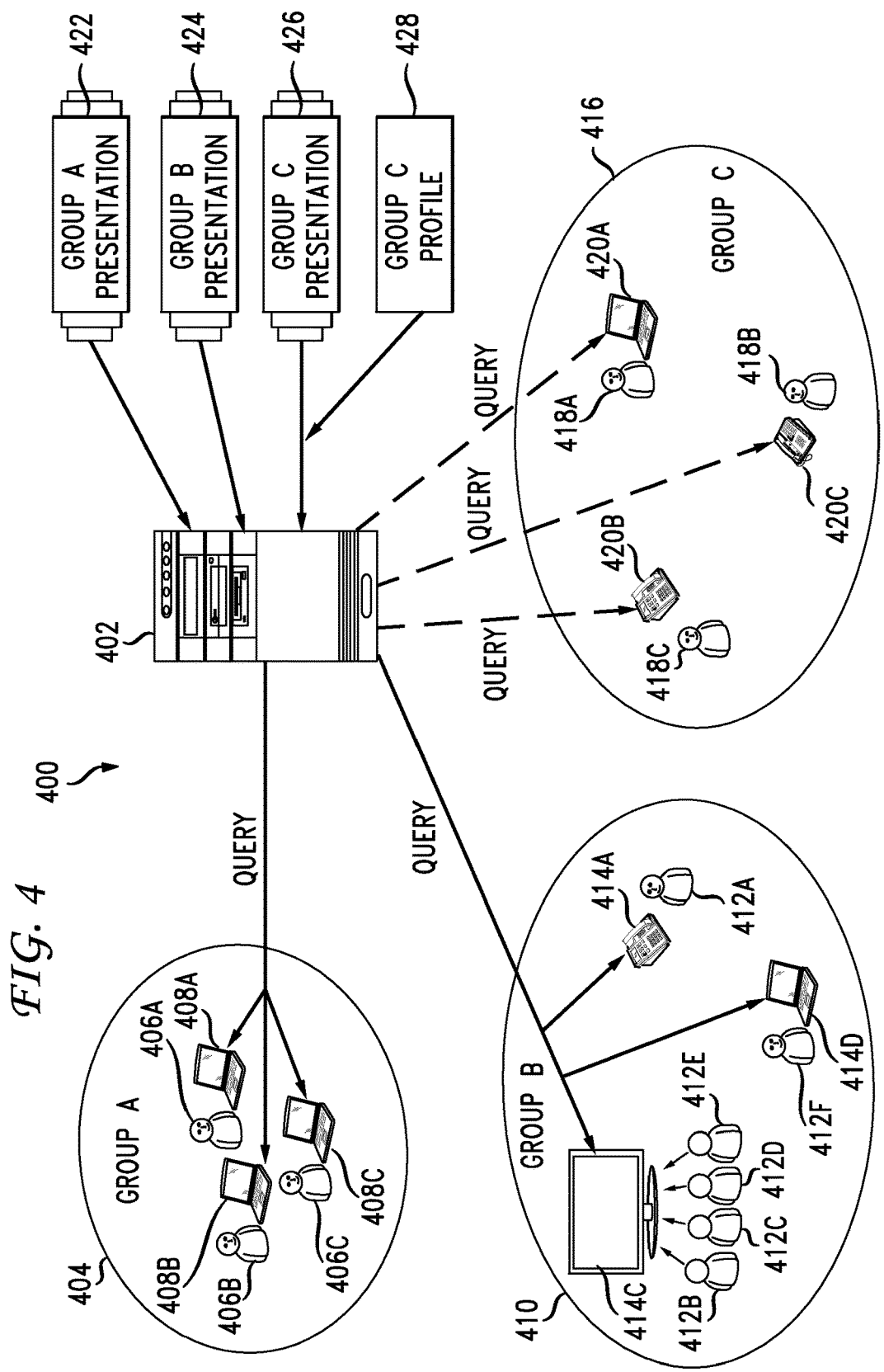
FIG. 4 illustrates an exemplary process for generating cues for presentations.

FIG. 4 illustrates an exemplary process 400 for generating cues for presentations. The system 402 receives presentations 422-26 to generate cues for the presentations 422-26. The presentation 422 is a presentation for group A 404, the presentation 424 is a presentation for group B 410, and the presentation 426 is a presentation for group C 416. Group A 404 includes participants 406A-C, group B 410 includes participants 412A-F, and group C 416 includes participants 418A-C. The system 402 queries the user devices 408A-C and 414A-C to determine the device capabilities and/or communication context of the participants 406A-C and 412A-F. The system 402 uses the device capabilities and/or communication context of the participants 406A-C to select and/or generate cues for the presentation 422, to be delivered to the participants 406A-C. Similarly, the system 402 uses the device capabilities and/or communication context of the participants 412A-F to select and/or generate cues for the presentation 424, to be delivered to the participants 412A-F.

With respect to the presentation 426, the system 402 selects and/or generates the cues for the presentation 426 based on the profile information 428 received by the system 402. The system 402 can optionally query the user devices 420A-C to determine the device capabilities and/or communication context of the participants 418A-C for selecting and/or generating the cues. The profile information 428 can include information about the group C 416, the participants 418A-C, the devices 420A-C, the communication context of the participants 418A-C, the environment, any disabilities of the participants 418A-C, events, and/or any restrictions. The profile information 428 can also include preferences, templates, parameters, predetermined cues, media files, predetermined triggers, delivery preferences, media type, rendering preferences, thresholds, style preferences, formatting settings, timing, media content, and so forth.

The cues selected and/or generated by the system 402 can be specific to a participant or in general to the group. As a non-limiting example, the system 402 can use a participant's device capabilities to determine whether to use text-to-speech, pop-up graphics, textual messages, captions, image alerts, video streams, and/or audio announcements to deliver the cues to the participant. The cues can also be specific to an event and/or interaction or general to the multimedia event. As a non-limiting example, the system 402 can generate a general cue to announce the number of slides in the slide presentation, and a specific cue can be generated to announce a specific slide transition. The cues can include audio, text, video, images, and so forth. For example, the cues can include, as non-limiting examples, text-to-speech, pop-up graphics, textual messages, system alerts, an audio announcement, a number, a character, a video, etc. The participants 306A-C, 312A-F, and 318A-C can subscribe to specific cues and/or events represented by the cues. Moreover, the participants 306A-C, 312A-F, and 318A-C can turn one or more cues on or off.

The system 402 can analyze the presentations 422-26 to identify events, topics, tags, parameters, formatting, and/or content in the presentations 422-26. The system 402 can then select or generate the cues according to the information identified in the respective presentations 422-26 and/or through monitoring the flow of presenting the presentations. For example, the system 402 can analyze the presentation 422 to identify slide numbers, and generate cues by converting the slide numbers to speech. The system 402 can also receive additional input, parameters, tags, rules, and information for selecting and/or generating the cues. The system 402 can embed the cues in the presentations 422-26 and/or store the cues separate from the presentations 422-26, or generate the cues as the presentation flows. The system 402 can also select and/or generate rules for transmitting the cues. The rules can be based on, as non-limiting examples, events, interactions, tags, schedules, parameters, content, conditions, media, context, users, groups, restrictions, schedules, device capabilities, preferences, messages, and so forth. Moreover, the system 402 can generate tags to represent interaction events that would trigger cues. Also, the system can generate a schema to define what interaction events should trigger a cue, how to describe the interaction events with the cues, what type of media to use for the cues, and/or how to deliver the cues.

Figure 5:
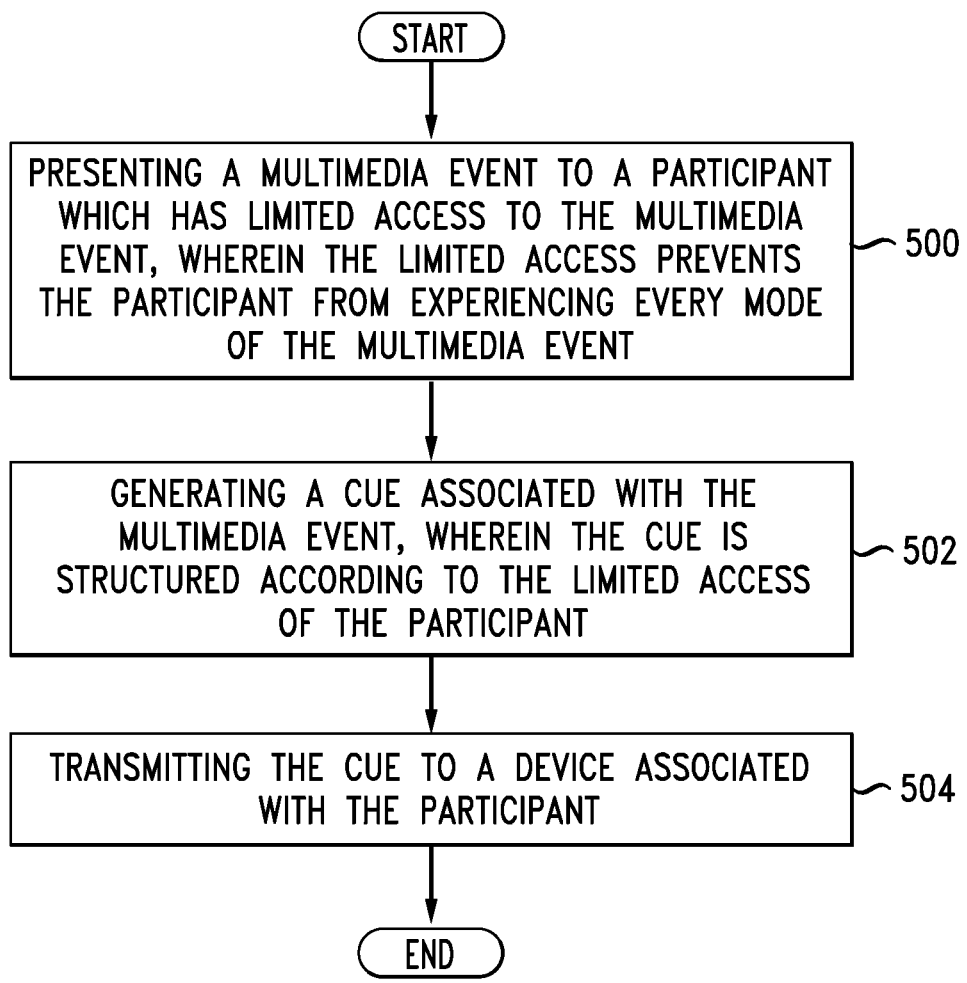
FIG. 5 illustrates an example method embodiment.

Having disclosed some basic system components and concepts, the disclosure now turns to the exemplary method embodiment shown in FIG. 5. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 presents a multimedia event to a participant which has limited access to the multimedia event, wherein the limited access prevents the participant from experiencing every mode of the multimedia event (500). The multimedia event can include various modes, such as, for example, an audio mode, a video mode, a text mode, a graphical mode, a gesture mode, a touch mode, an interaction mode, a visual mode, a web mode, a virtual reality mode, and so forth. For example, the multimedia event can include speech, video, and a slide presentation. The multimedia event can include multimodal interactions. For example, the multimedia event can include distinct forms of input and output of data, such as pen, speech, gestures, touch, body movements, keyboard, etc. The system 100 also generates a cue associated with the multimedia event, wherein the cue is structured according to the limited access of the participant (502). The system 100 then transmits the cue to a device associated with the participant (504).

The system 100 can deliver the cue to the device associated with the participant using, for example, an image, a video, text and/or audio. Moreover, the system 100 can generate the cue before or after it presents the multimedia event to the participant. The system 100 can also generate the cue dynamically as it presents the multimedia event to the participant. The system 100 can embed the cue in media content from the multimedia event. For example, the system 100 can embed the cue in a slide presentation in the multimedia event. The cue can also be separate from the media in the multimedia event. The cue can be delivered by the system 100 directly to the device associated with the participant and/or can be delivered to a system that communicates with the device associated with the participant. As a non-limiting example, the system 100 can deliver the cue to a conference bridge serving several participants that share the same limited access.

The cue can be structured according to, as non-limiting examples, an event, an interaction, an access mode, a parameter, a profile, a tag, an input, a schedule, a user, a group, a location, a language, a preference, a definition, a rule, a style, a design, a template, a request, a restriction, a disability, an intent, an application, a delivery method, an environment, an audience, a communication context, a presentation, a schema, a media type, a topic, a subject, a file, a message, domain information, device capabilities, and any combination thereof. In one aspect, the cue is structured according to media content in the multimedia presentation. Here, the system 100 can analyze the media content in the media presentation to structure the cue according to the media content. For example, the system 100 can analyze a slide presentation to identify slide numbers in the slide presentation, and generate the cue by converting the slide numbers to speech or otherwise generating an appropriate verbal cue representing a slide transition. The cue can be, as non-limiting examples, audio, text, video, an image, web-based, window-based, text-to-speech, and/or any combination thereof. The cue can include, as non-limiting examples, an audio cue, a video cue, a caption, a visual enhancement, a textual enhancement, a pop-up, a sound effect, a visual effect, a special effect, an action by a virtual reality object, an action by a virtual agent, an action by a virtual assistant, an image, an action by an avatar, an animation, an alert, a message, a number, a symbol, an announcement, a character, a sound, and so forth. In one aspect, the cue is a verbal transition announcement in a slide presentation. As a non-limiting example, the cue can be a virtual agent which provides visual announcements associated with the multimedia event. In another embodiment, the cue is a system alert in a chat. In yet another embodiment, the cue is a caption in a video stream.

The multimedia event can include, for example, a slide presentation, a conference call, a web conference, a video conference, a webcast, an online collaboration, a chat, a blog, a wiki, a web page, an online game, an online activity, and so forth. The cue can be selected and/or generated based on a trigger, such as a visual event, an audio event, an external event, an input, an interaction, a tag, a profile, a message, a schedule, a transition, a parameter, a request, a rule, a subscription, etc. For example, the cue can be selected from a database of cues based on a tag used to represent an interaction event that should trigger the cue. In one aspect, the system 100 generates a cue at the start of an interaction event to which the participant has subscribed to. In another aspect, the system 100 transmits a cue when a slide in a slide presentation is opened or closed. Here, the cue can be a transition announcement or a slide number, for example.

Moreover, the system 100 can also use context information to determine if a cue should not be transmitted when the cue has been triggered by an event. For example, the system 100 can sense out-of-order slide transitions in a slide presentation and stop or pause the cues. The system 100 can also use smart processing to determine when to transmit a cue. For example, the system 100 can sense a pause in a presenter's verbal delivery and transmit the cue during the pause. The system 100 can transmit the cue to a group in the multimedia event or a specific participant in the multimedia event. The system 100 can deliver announcements to a local audience and/or a remote audience. The system 100 can transmit audio cues in normal volume or a modified volume. For example, the system 100 can deliver audio cues as whispers or any other distinctive delivery. The system 100 can use audio mixing, coloration technologies, or other technologies such as 3D spatial audio to deliver audio cues in ways to make the audio cues easily distinguishable from the presenter's verbal delivery. Similarly, the system 100 can modify the attributes of video, image, and/or text cues to make them distinguishable from other content in the multimedia event. For example, the system 100 can use flashing alerts to distinguish the alerts from other content in the multimedia content. As another example, the system 100 can dim text in cues and/or use specific formatting in the cues, such as color, to distinguish the cues from the other content in the multimedia presentation. The method of delivery can be selected manually or automatically. For example, the participant can manually select the method for receiving the cue. The participant can also turn the cue on or off, pause the cue, replay the cue, skip the cue, edit the cue, forward the cue, save the cue, and so forth.

Further, the system 100 can query the device associated with the participant to determine the media access capabilities of the participant. In one embodiment, the system presents the multimedia event to a plurality of participants, queries a respective device associated with each of the plurality of participants to determine respective media access capabilities associated with each of the plurality of participants, and generates a set of cues associated with the multimedia event, wherein the set of cues is structured according to the respective media access capabilities. As a non-limiting example, the media access capabilities can include the hardware capabilities of a device used in the event. As another non-limiting example, the media access capabilities can also include the media capabilities actually used in the event by the plurality of participants. For example, a participant may use a device in the event which has web conference capabilities, but the device may have the web conference capabilities turned off, restricted, limited, and/or otherwise not working. The system 100 can then deliver the set of cues to the respective participants or the entire plurality of participants. In another embodiment, the multimedia event includes a slide presentation and the cue is embedded in the slide presentation as a slide number and converted to speech from text and presented as audio when a respective slide is opened.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, optical links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   identifying a plurality of devices participating in a multimedia event having a plurality of different modes of interaction, wherein a first identified device of the plurality of devices has limited access to the plurality of different modes of interaction, and wherein the limited access of the device comprises having access to a first mode of interaction and not having access to a second mode of interaction;
   determining access of each device to each mode of the plurality of different modes of interaction;
   presenting the multimedia event to the plurality of devices participating in the multimedia event;
   generating, based on the determined access of each device of the plurality of devices, a plurality of cues associated with an event within the multimedia event and comprising a first cue in the first mode of interaction and associated with the second mode of interaction and a second cue in the second mode of interaction and associated with the first mode of interaction or the second mode of interaction;
   determining a current context of the presented multimedia event and a current context of a participant in the multimedia event associated with each of the plurality of devices, wherein the current context of the multimedia event comprises at least one of a presented order of content in the multimedia event, a delivery of the multimedia event in at least one of the plurality of different modes of interaction, or a pause in delivery of the multimedia event in at least one of the plurality of modes of interaction;
   transmitting the generated first cue to the first device based on the determined current context of the presented multimedia event and the determined current context of the participant associated with the first device; and
   transmitting the generated second cue to the second device based on the determined current context of the presented multimedia event and the determined current context of the participant associated with the second device.

2. The method of claim 1, wherein the generated first and second cue are embedded in the multimedia event.

3. The method of claim 1, wherein the multimedia event comprises one of a slide presentation, a conference call, a web conference, a video conference, a webcast, a virtual reality display, a graphical display, a gesture, a special effect, a voice, and an online meeting.

4. The method of claim 1, wherein the multimedia event comprises a slide presentation, and wherein the generated first cue associated with the second mode of interaction is triggered by one of a slide opening, a slide closing, a pause, a message, a parameter, a schedule, a transition, and an external event.

5. The method of claim 1, wherein the multimedia event comprises a slide presentation, and wherein the generated first cue associated with the second mode of interaction comprises a slide number that is converted to speech and presented as audio when a respective slide is opened.

6. The method of claim 1, wherein the generated first cue associated with the second mode of interaction is triggered by one of a visual event, an audio event, an external event, an input, an interaction, a tag, a profile, a message, a schedule, a transition, and a parameter.

7. The method of claim 1, wherein the multimedia event comprises a slide presentation, and wherein the generated first cue associated with the second mode of interaction comprises one of a verbal transition announcement, a sound effect, and an audio alert.

8. The method of claim 7, further comprising transmitting the verbal transition announcement to the first device during a pause in a presenter's verbal delivery.

9. The method of claim 8, wherein the generated second cue comprises at least one of a video cue, a video enhancement, a textual enhancement, a pop-up, a sound effect, an image, an animation, an alert, an action by an avatar, a message, a number, a symbol, an announcement, or a character.

10. The method of claim 1, further comprising delivering the generated first cue associated with the second mode of interaction to the first device associated with the participant by using one of text, image, video, and audio.

11. A system comprising:
a processor; and
a computer-readable storage medium storing instructions which, when executed by the processor, cause the processor to perform operations comprising:
identifying a plurality of devices participating in a multimedia event having a plurality of different modes of interaction, wherein a first identified device of the plurality of devices has limited access to the plurality of different modes of interaction, and wherein the limited access of the device comprises having access to a first mode of interaction and not having access to a second mode of interaction;
determining access of each device to each mode of the plurality of different modes of interaction;
presenting the multimedia event to the plurality of devices participating in the multimedia event;
generating, based on the determined access of each device of the plurality of devices, a plurality of cues associated with an event within the multimedia event and comprising a first cue in the first mode of interaction and associated with the second mode of interaction and a second cue in the second mode of interaction and associated with the first mode of interaction or the second mode of interaction;
determining a current context of the presented media event and a current context of a participant in the multimedia event associated with each of the plurality of devices, wherein the current context of the multimedia event comprises at least one of a presented order of content in the multimedia event, a delivery of the multimedia event in at least one of the plurality of different modes of interaction, or a pause in delivery of the multimedia event in at least one of the plurality of modes of interaction;
modifying the first cue based on the determined current context of the presented media event and the determined current context of the participant associated with the first device;
transmitting the modified first cue to the first device; and
transmitting the generated second cue to the second device and the transmitted generated second cue is based on the determined current context of the participant associated with the second device.

12. The system of claim 11, wherein the generated first cue is one of a caption, a visual enhancement, a textual enhancement, a pop-up, an image, an animation, an action by an avatar, an alert, a message, a number, a symbol, an announcement, and a character.

13. A computer-readable storage device storing instructions which, when executed by a processor, cause the processor to perform operations comprising:
identifying a plurality of devices participating in a multimedia event having a plurality of different modes of interaction, wherein a first identified device of the plurality of devices has limited access to the plurality of different modes of interaction, and wherein the limited access of the device comprises having access to a first mode of interaction and not having access to a second mode of interaction;
determining access of each device to each mode of the plurality of different modes of interaction;
presenting the multimedia event to the plurality of devices participating in the multimedia event;
generating, based on the determined access of each device of the plurality of devices, a plurality of cues associated with an event within the multimedia event and comprising a first cue in the first mode of interaction and associated with the second mode of interaction and a second cue in the second mode of interaction and associated with the first mode of interaction or the second mode of interaction;
determining a current context of the presented multimedia event and a current context of a participant in the multimedia event associated with each of the plurality of devices, wherein the current context of the multimedia event comprises at least one of a presented order of content in the multimedia event, a delivery of the multimedia event in at least one of the plurality of different modes of interaction, or a pause in delivery of the multimedia event in at least one of the plurality of modes of interaction;
transmitting the generated first cue to the first device based on the determined current context of the presented multimedia event and the determined current context of the participant associated with the first device;
modifying the generated second cue based on the determined current context of the presented multimedia event and the determined current context of the participant associated with the second device; and
transmitting the modified second cue to the second device.

14. The computer-readable storage device of claim 13, wherein the generated first cue is triggered by one of a visual event, an audio event, an external event, an input, an interaction, a tag, a profile, a message, a schedule, a transition, and a parameter.

15. The computer-readable storage device of claim 13, wherein the generated first cue comprises one of a pop-up, a sound effect, an action by an avatar, an alert, a message, a number, a symbol, an announcement, and a character.

16. The method of claim 1, wherein the generated first cue further comprises an audio effect.

17. The method of claim 1, wherein the multimedia event comprises a presentation, and wherein the generated first cue and second cue are generated and presented based on an analysis of a transition in the presentation.

* * * * *